（12）United States Patent
Kozuki

(10) Patent No.: US 7,535,833 B2
(45) Date of Patent: May 19, 2009

(54) STATISTIC COUNTER DEVICE

(75) Inventor: Takeshi Kozuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 11/201,607

(22) Filed: Aug. 10, 2005

(65) Prior Publication Data

US 2006/0007857 A1     Jan. 12, 2006

Related U.S. Application Data

(63) Continuation of application No. PCT/JP03/07340, filed on Jun. 10, 2003.

(51) Int. Cl.
*G01R 31/08*     (2006.01)
*G06F 15/173*     (2006.01)

(52) U.S. Cl. ........................ 370/229; 370/363; 370/428; 370/254; 709/224

(58) Field of Classification Search .................. 370/229, 370/363, 428, 252, 241, 250, 389, 392, 352, 370/254; 709/223, 224
See application file for complete search history.

(56) References Cited

U.S. PATENT DOCUMENTS 5,638,435 A * 6/1997 Axling et al. ................ 379/286
6,690,650 B1 * 2/2004 Stener ........................ 370/241
7,304,942 B1 * 12/2007 Malladi et al. .............. 370/229

FOREIGN PATENT DOCUMENTS

| JP | 4-227582 | 8/1992 |
| JP | 8-032444 | 2/1996 |
| JP | 8-237112 | 9/1996 |

OTHER PUBLICATIONS

International Search Report dated Sep. 24, 2003.

* cited by examiner

*Primary Examiner*—Aung S Moe
*Assistant Examiner*—Jamal Javaid
(74) *Attorney, Agent, or Firm*—Katten Muchin Rosenman LLP

(57) ABSTRACT

In a statistic counter device comprising a plurality of statistic counters which count statistic information, in order to reduce a hardware scale and power consumption by dynamically controlling a bit number of the statistic counters, a counter management portion forms extension counters by dynamically linking standby counters to higher digits of base counters when the base counters reach the full count or a count before the full count by a fixed range, and releases the link when the extension counters are reset.

10 Claims, 12 Drawing Sheets

FIG. 6A
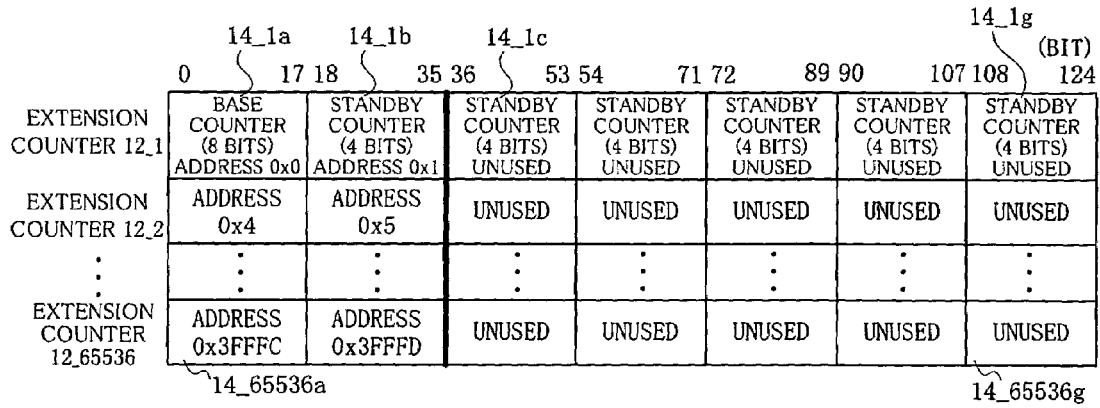
FIG. 6B
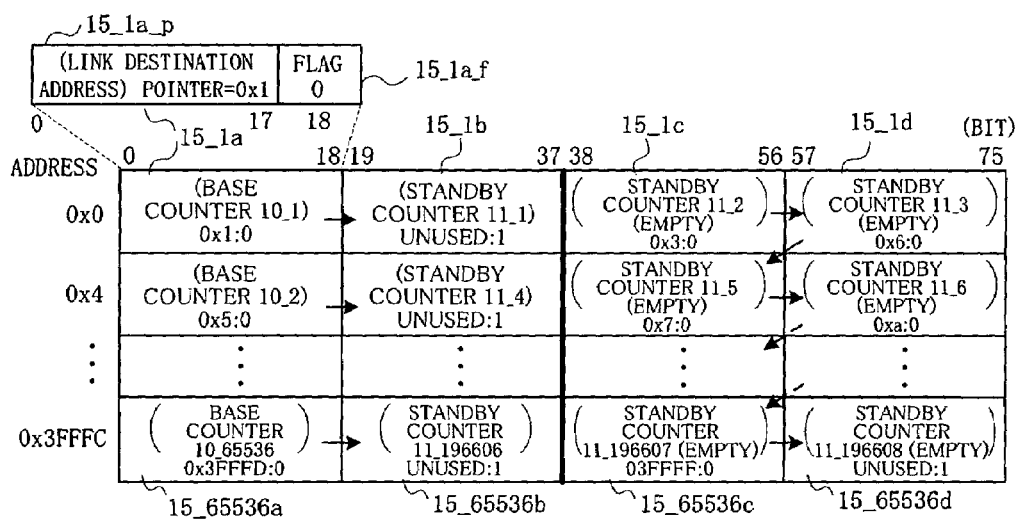
FIG. 6C
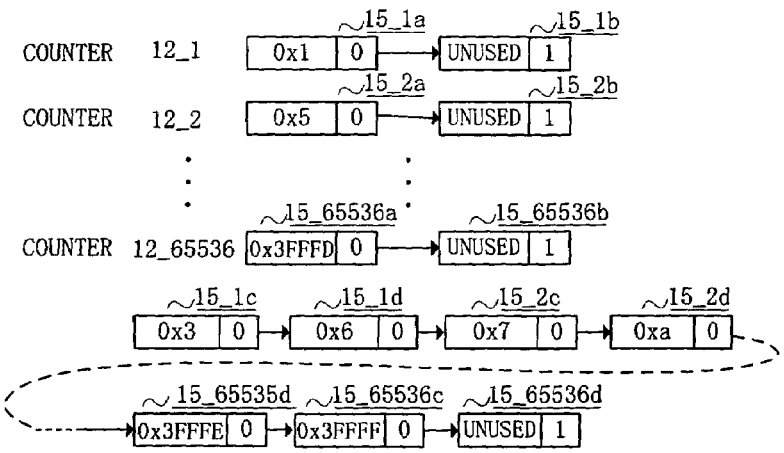
FIG. 6D

FIG. 7A
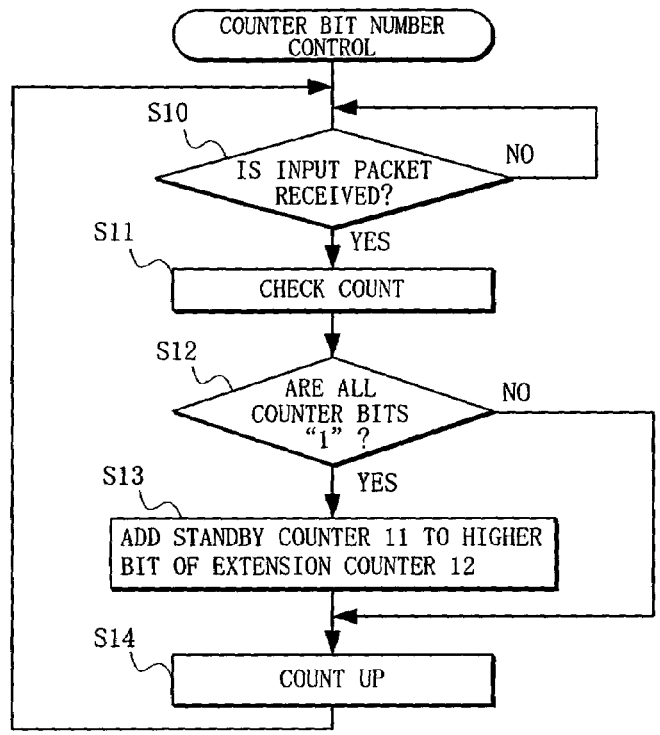
FIG. 7B
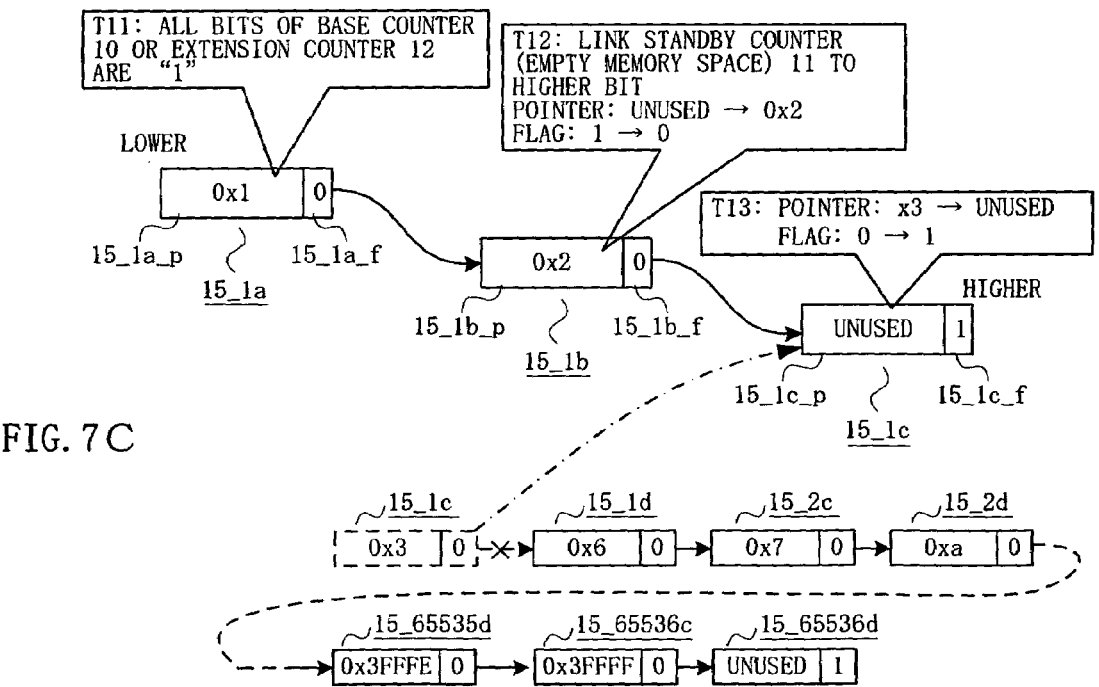
FIG. 7C

US 7,535,833 B2

STATISTIC COUNTER DEVICE

CROSS-REFERENCE TO RELATED APPLICATION

This application is a continuation of International Application PCT/JP03/07340 filed on Jun. 10, 2003, the contents of which are herein wholly incorporated by reference.

BACKGROUND OF THE INVENTION

1. Field of the Invention

The present invention relates to a statistic counter device, and in particular to a statistic counter device comprising a plurality of statistic counters which count statistic information.

Together with a recent speed enhancement in a communication technology and spread of a device therefor such as a mobile telephone and the Internet, kinds and number of statistic information such as kinds and number of packets have been increased more and more. In order to deal with such statistic information, it is required to increase the number of statistic counters and the bit number thereof.

2. Description of the Related Art

FIG. 12 shows a router (or router board) $200z$ connected to a network 400. The router $200z$ is provided with a routing chip $110z$, physical layer interfaces 150_1 and 150_2, MAC layer interfaces 140_1 and 140_2, a CPU 130 and a memory 120.

The routing chip $110z$ is provided with 32-bit statistic counters $10z\_1$-$10z\_65536$ (hereinafter, occasionally represented by a reference numeral $10z$), and the memory 120 is provided with e.g. 48-bit packet counters 121_1-121_65536 (hereinafter, occasionally represented by a reference numeral 121) respectively corresponding to the statistic counters $10z\_1$-$10z\_65536$.

The statistic counter $10z$ is (1) for counting transmission/reception packets, (2) for counting discarded packets or (3) for an octet counter.

The statistic counter for the transmission/reception packets in the above-mentioned (1) is used for billing, a fault investigation and the like, the statistic counter for discarded packets in the above-mentioned (2) is used for the fault investigation and the like, and the octet counter in the above-mentioned (3) is used for a bandwidth management, the billing, the fault investigation and the like.

By taking the statistic counter $10z$ counting the packets in the above-mentioned (1) and (2) as an example, operations related to the statistic counter $10z$ will now be described. The bit number of the statistic counter $10z$ is 32 bits in the same way as that for general data or the like.

Step T51: A statistic counter device $100z$ receives packets P1 through the physical layer interface 150_1 and the MAC layer interface 140_1 from the network 400. The statistic counter $10z\_1$ corresponding to the packets P1 in the statistic counter device $100z$ counts the packets P1 from a corresponding user.

Then, the packets P1 are transmitted to the network 400 through the MAC layer interface 140_2 and the physical layer interface 150_2.

Hereafter, packets P2-P65536 from users of the network 400 are similarly counted by the corresponding statistic counters $10z\_2$-$10z\_65536$, respectively.

Steps T52 and T53: The 32-bit statistic counter $10z\_1$ can not count the packets P1 equal to or more than "$2^{32}$-1" ($\approx$4,000,000,000). Therefore, before all of the bits of the statistic counter $10z\_1$ assume "1", for example, the CPU 130 reads the value of the statistic counter $10z\_1$, adds the value to the packet counter 121_1 in the memory 120, and resets the statistic counter $10z\_1$ to "0".

Similarly, before all of the bits of the statistic counters $10z\_2$-$10z\_65536$ assume "1" respectively, the CPU 130 reads the values of the statistic counters $10z\_2$-$10z\_65536$, adds the values to the packet counters 121_2-121_65536, and resets the statistic counters $10z\_2$-$10z\_65536$ to "0".

Thus, it becomes possible to count e.g. the packets P1 until the packet counter 121_1 reaches a full count based on the bit number. If the bit number of e.g. the packet counter 121_1="48", the packets up to "$2^{48}$-1" can be counted.

When the router $200z$ has numerous communication lines such as Internet Data Center (hereinafter, abbreviated as IDC), counting process per user is required, so that the number of counters increases. Also, with a speed enhancement (10 Mbps→100 Mbps→1 Gbps→10 Gbps) of a communication line speed, a packet flow per unit time increases, so that it is required to increase the bit number of the counter which counts the packet flow.

When a communication line bandwidth is 10 Gbps, for example, the packet flow per second assumes approximately 15 Mpps (1 packet=64 bytes). Supposing that an access period of the CPU 130 requires approximately four minutes, the count of the statistic counter $10z$ for four minutes assumes 15 Mpps*4*60≈3.6 G<$2^{32}$, namely the required bit number of each statistic counter $10z$ assumes 32 bits.

As a result, enlarging the hardware scale and increasing the power consumption become significant problems.

The maximum capacity of a chip composing the statistic counter device $100z$ is approximately 17 MBC (Basic Cell) in case of 14 mm □ chip of 0.11 μm process. The counter scale is approximately 1.4 kBC in the 32-bit counter, and 3.5 kBC in the 36-bit counter.

When the statistic counter counts packets of only a single kind for 1000 users, for example, a percentage of the statistic counter to the entire chip assumes approximately 8% ($\approx$(1.4 k×1000/17 M)×100) in the 32-bit counter, so that the scale of the statistic counter in the entire chip is too large to be neglected. Also, the percentage of the power consumption of the statistic counter to the entire chip assumes substantially the same percentage as the statistic counter scale.

As an example of a counter reducing a total bit number of two counters (e.g. X/Y address counters respectively counting addresses in the directions of X and Y), there is a single counter in which a first counting means (lower digit side), a second counting means of "n" ("n" is a positive integer) units, and a third counting means (higher digit side) are cascaded (see e.g. patent document 1).

This counter is separated into two counters, which are respectively made an X address counter and a Y address counter. Namely, the X address counter is composed of the first counting means and a second counting means of 0–i (i≦n) units of lower digit side, and the Y address counter is composed of the second counting means of the remaining higher digit side and the third counting means, whereby bit numbers of the X address counter and the Y address counter are made variable to reduce the hardware scale.

A first counting circuit uses a counter of a fixed bit number in this device. Therefore, when a user who can use a counter with a smaller bit number than the fixed bit number uses the first counting circuit, there has been a disadvantage of incurring waste in the hardware.

As a counting circuit (counter) for improving the disadvantage, there is a counting circuit including a predetermined number of unit counters performing a calculation operation in response to supplies of a start bit selection signal designating either a carry output of a counter at a preceding stage or a predetermined voltage level to be effective as a carry input and a count enable signal designating a count operation permission/prohibition, outputting a predetermined count result and outputting a carry output to a subsequent stage to be cascaded, and the predetermined number of registers temporarily storing the start bit selection signal and the count enable signal and outputting the start bit selection signal and the count enable signal to each of the unit counters (see e.g. patent document 2).

Since this counting circuit can be divided into a plurality of independent counters of arbitrary bit numbers, hardware resources can be efficiently used flexibly meeting with user's request.

However, in the above-mentioned two methods, the bit number of each counter has to be preliminarily designated and the optimum bit number can not be automatically designated during the count operation.

<Patent Document 1>

Japanese Patent Application Laid-open No. 4-227582

<Patent Document 2>

Japanese Patent Application Laid-open No. 8-237112

SUMMARY OF THE INVENTION

It is accordingly an object of the present invention to provide a statistic counter device comprising a plurality of statistic counters which count statistic information, wherein a hardware scale and power consumption are reduced by dynamically controlling a bit number of the statistic counters.

In order to achieve the above-mentioned object, a statistic counter device of the present invention comprises: a plurality of base counters; a plurality of standby counters; and a counter management portion which forms extension counters by dynamically linking the standby counters to higher digits of the base counters when the base counters reach a full count or a count before the full count by a fixed range, and releases the link when the extension counters are reset.

FIGS. 1A and 1B show a principle of the statistic counter device according to the present invention. FIG. 1A shows a prior art 32-bit statistic counter $10z$ whose bit number is fixed. The statistic counter $10z$ is composed of the prior art statistic counters $10z\_1$-$10z\_1024$ and corresponds to 1024 ($=2^{10}$) users. When packets addressed to the same user corresponding to e.g. the statistic counter $10z\_1$ occupy an entire bandwidth (10 Gbps) of a line in the statistic counter device $100z$ (see FIG. 12), the other counters $10z\_2$-$10z\_1024$ are unnecessary and useless. Namely, a bit number of the counter required by the statistic counter device $100z$ can be only 32 bits.

FIG. 1B shows a case where a statistic counter device 100 (see FIG. 4) of the present invention receives packets addressed to 1024($=2^{10}$) users distributed equally and concurrently (namely, when an entire bandwidth (10 Gbps) is divided to 10 Gbps/1024≈10 Mbps for reception), and the number of packets counted by the base counters $10\_1$-$10\_1024$ is $2^{22}$ ($=2^{32}/1024=2^{32-10}$). Namely, the bit number required by the statistic counter device 100 is 22×1024 bits in the counters $10\_1a$-$10\_1024a$. The counters $10\_1b$-$10\_1024b$ of hatched portions are excessive.

When e.g. the counter $10\_1$ has to count packets equal to or more than $2^{22}$ packets, another counter, e.g. the counter $10\_2$ should count fewer packets than packets of the counter $10\_1$ by equal to or more than 22 bits, so that the bit number is excessive. Therefore, the excessive bit number has only to be connected (linked) to the higher digit of the counter $10\_1$.

FIGS. 2A and 2B show a case where the number of users (the number of counters) in FIGS. 1A and 1B is 65536 ($=2^{16}$). FIG. 2A is the same as FIG. 1A. FIG. 2B shows a case where the statistic counter device 100 receives 65536 ($=2^{16}$) packets addressed to users of the same number, and the number of packets counted by the base counters $10\_1$-$10\_65536$ is $2^{16}$ ($=2^{32}/2^{16}$). Namely, the bit number of counters required by the statistic counter device 100 is 16×65536 bits.

In the same way as FIG. 1B, when e.g. the counter $10\_1$ has to count more than $2^{16}$ packets, another counter, e.g. the counter $10\_2$ should count fewer packets than packets of the counter $10\_1$ by equal to or more than 16 bits, so that the bit number is excessive. Therefore, the excessive bit number has only to be linked to the higher digit of the counter $10\_1$.

The statistic counter device 100 of the present invention is composed of a plurality of base counters 10, a plurality of standby counters 11 and a counter management portion 13.

FIGS. 3A and 3B respectively exemplify the base counters 10 and the standby counters 11 in the statistic counter device 100 of the present invention, which are composed of 8-bit base counters $10\_1$-$10\_65536$ (hereinafter, occasionally represented by a reference numeral 10), and 4-bit standby counters $11\_1$-$11\_131072$ (hereinafter, occasionally represented by a reference numeral 11) respectively, and correspond to 65536 users.

The bit numbers of the standby counters 11 and the number of standby counters 11 are determined so that the standby counters may be linked to the higher digits of the base counters 10 and be extended to a predetermined bit number (count).

FIG. 3C shows an example in which the standby counters 11 are linked to the base counters 10 and extension counters are formed.

The base counters 10 count packets corresponding to e.g. users. When e.g. the base counter $10\_2$ reaches a full count in the counter management portion 13 (not shown in FIGS. 3A-3C), namely, when each bit of the base counter $10\_2$ assumes "all 1", or a count before the full count by a fixed range, the standby counter $11\_4$ unused is linked to the higher digit of the base counter $10\_2$ to form the extension counter $12\_2$.

Also, when the extension counter $12\_2$ is reset, for example when the packets are read by another packet counter $121\_2$ on the memory 120 by the CPU 130 and the extension counter $12\_2$ is reset (see FIG. 12), the counter management portion 13 separates the standby counter $11\_4$ from the extension counter $12\_2$, so that only the base counter $10\_2$ is left. The separated standby counter $11\_4$ stands by in order to extend the bit number of other base counters 10.

It is to be noted that even when the standby counter 11 is not linked (none is added) such as the base counter $10\_65536$ shown in FIG. 3C, the counter is referred to as the extension counter $12\_65536$.

The thus arranged extension counter 12 achieves an effect as follows: Namely, as shown in FIGS. 1B and 2B, it becomes possible to lessen a total of the bit numbers of all the base counters 10 and all the standby counters 11 required, compared with the total of the bit numbers of all the prior art statistic counters $10z$, thereby reducing a hardware scale and power consumption.

Also, in the above-mentioned present invention, when the extension counters reach the full count or the count before the full count by the fixed range, the counter management portion may form re-extension counters in which the standby counters are linked to higher digits of the extension counters.

Namely, in FIG. 3C, a re-extension counter 12 can be formed in which the standby counter $11\_2$ is further linked to the higher digit of the extension counter 12 composed of e.g. the base counter 10_1 and the standby counter 11_1. Furthermore, it is possible to repeatedly form the extension counter 12_1 by linking the standby counter 11_3 to the re-extension counter 12.

Thus, it becomes possible to make the bit number of the extension counter 12 a required bit number, and to minutely set the bit number of the extension counter 12 by reducing the bit number of the standby counter 11.

Also, in the above-mentioned present invention, a total bit number of all of the base counters and all of the standby counters may be equal to or more than a value obtained by multiplying a bit number of a counter capable of counting a value obtained by dividing a total count counted by all of the base counters and the extension counters within a predetermined time by a number of the base counters, by the number of the base counters, and may be less than a value obtained by multiplying a bit number which a single counter requires for counting the total count by the number of the base counters.

Thus, it becomes possible to secure counters for the bit number corresponding to the worst case where all of the extension counters assume the same count within a predetermined time, namely, where the total of the bit number of all of the extension counters becomes maximum.

It is to be noted that the bit number required depends on the bit numbers of the base counters and the standby counters. For example, when the bit numbers of the base counters and the standby counters are both 1, it becomes possible to minutely set the bit number of the extension counters, and the number of all of the bits required becomes minimum.

Also, in the above-mentioned present invention, a total bit number of all of the base counters and all of the standby counters, and numbers of the base counters and the standby counters may be values corresponding to a distribution state of a bandwidth of a user packet.

For example, when the bandwidths of the user packets are different, the bit numbers of the basic/extension counters required for each user are different. Since the extension counter of a user whose bandwidth is large uses bits whose weights are larger for higher digits, the bit number required for the extension counter of a user whose bandwidth is small is reduced. Accordingly, the total bit number of the base counters and the standby counters can be reduced compared with the worst case described referring to FIGS. 1A, 1B, 2A and 2B.

Also, in the above-mentioned present invention, the counter management portion may include a counter management memory indicating a link state of the base counters and the standby counters.

Thus, it becomes possible for the counter management portion to recognize an arrangement of the base counters or the extension counters corresponding to users.

Also, in the above-mentioned present invention, the counter management portion may include a counter management cache memory indicating extension counters composed of the base counters and the standby counters which are in the link state indicated by the counter management memory.

Namely, a counter management cache memory indicates the base counters and the standby counters which form the extension counters.

Thus, it becomes possible for the counter management portion to perform a count operation of the extension counters at a high speed based on the counter management cache memory.

Also, in the above-mentioned present invention, the counter management portion may reset the base counters and the extension counters at a predetermined period.

Also, in the above-mentioned present invention, the counter management portion may add a value of the base counters and the extension counters to a corresponding external counter before the reset.

Also, in the above-mentioned present invention, a total bit number of all of the base counters and all of the standby counters, and numbers of the base counters and the standby counters may be values corresponding to a stochastic distribution state of a user packet.

Namely, as for the counts of the user packets, as the number of users increases, the probability of occurrence of the same number at the same time is low. Accordingly, the total bit number of all of the base counters and the standby counters can be further reduced compared with the case of the above-mentioned FIG. 1B and FIG. 2B.

Also, in the above-mentioned present invention, when the standby counters used for a linkage run short, the counter management portion may reset the base counters or the extension counters to which the standby counters can not be linked.

Furthermore, in the above-mentioned present invention, the counter management portion may add values of the base counters or the extension counters to a corresponding external counter before the reset.

For example, when the counts of the base counters and the extension counters are added to the external counters at a predetermined period, and when bit numbers of all of the base counters and the standby counters are determined by values corresponding to a stochastic distribution state, there is a possibility that the standby counters run short. When the standby counters run short, by adding the count of the base counters or the extension counters which have been unable to be extended to the corresponding external counters, a count error can be eliminated.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 6A-6D are diagrams showing examples of a counter management cache memory and a counter management memory in a statistic counter device according to the present invention;

FIGS. 7A-7C are diagrams showing an operation procedure example (1) of a statistic counter device according to the present invention;

DESCRIPTION OF THE EMBODIMENTS

Figure 4:
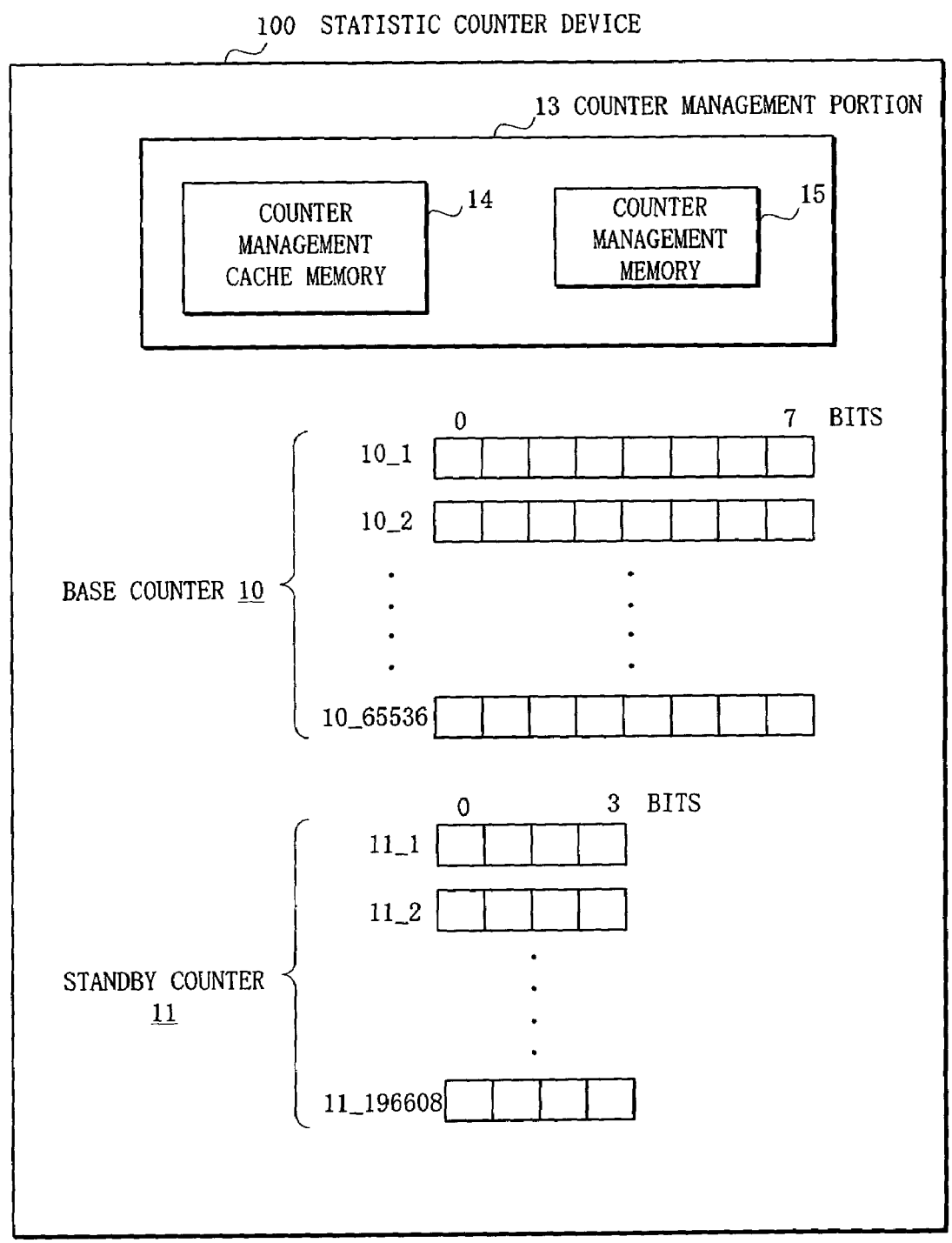
FIG. 4 is a block diagram showing an embodiment (1) of a statistic counter device according to the present invention.

FIG. 4 shows an embodiment (1) of the statistic counter device 100 according to the present invention. This statistic counter device 100 is composed of the counter management portion 13, the base counters 10 and the standby counters 11. The statistic counter device 100 can be composed of an LSI.

The counter management portion 13 is provided with a counter management cache memory 14 and a counter management memory 15. The base counters 10 are composed of 8-bit base counters 10_1-10_65536 (hereinafter, occasionally represented by a reference numeral 10), and the standby counters 11 are composed of 4-bit standby counters 11_1-11_196608 (65536×3) (hereinafter, occasionally represented by a reference numeral 11).

The counter management portion 13 can form a maximum 32-bit extension counter 12 by connecting the maximum six 4-bit standby counters 11 to a single 8-bit base counter 10.

It is to be noted that if the extension counter 12 can be formed per bit, the bit number of all of the counters required by the statistic counter device 100 in case of the number of users=65536 may be the total bit number of all of the base counters 10 and the standby counters 11="16×65536". However, the number of links and link disconnections of the standby counters 11 is increased.

In this embodiment (1), the number of links and link disconnections can be reduced by using the 8-bit base counters 10 and the 4-bit standby counters 11, and the number of the standby counters 11 as a substitute is increased by 65536, whereby the total bit number of all of the base counters 10 and the standby counters 11 are made "20×65536".

Figure 5:
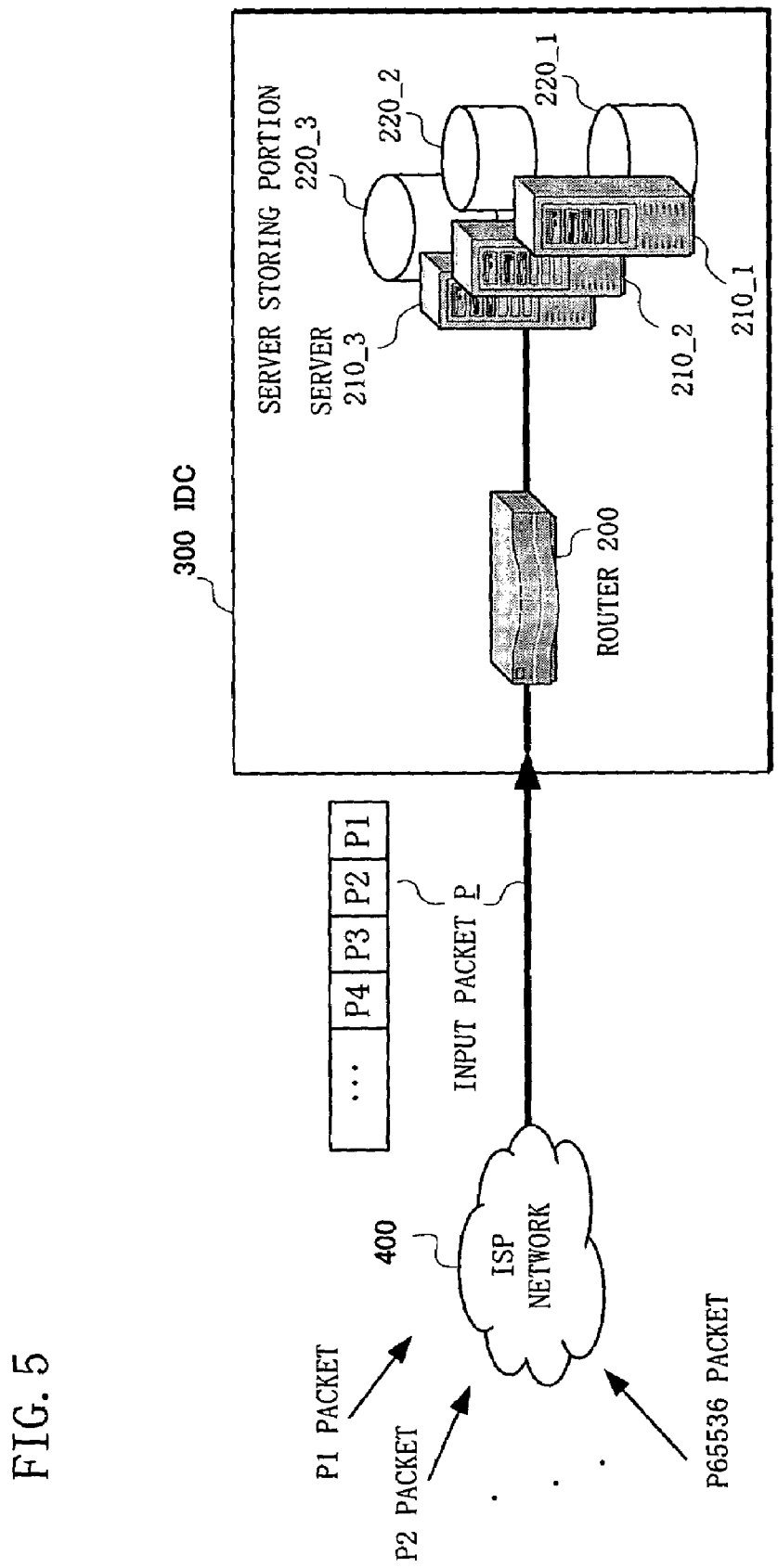
FIG. 5 is a block diagram showing a network example using a router including a statistic counter device according to the present invention.

FIG. 5 shows a router 200 provided with the statistic counter device 100 according to the present invention. The router 200 forms an IDC 300 together with servers 210_1-210_3 and the server storing portions 220_1-220_3. Also, the router 200 is connected to a network 400, and receives packets P1, P2, . . . , P65536 from the network 400.

FIGS. 6A-6D show in more detail the counter management cache memory 14 and the counter management memory 15 shown in FIG. 4.

FIG. 6B specifically shows an arrangement of an initial state of the counter management memory 15. The counter management memory 15 is composed of 19-bit memory fields 15_1a-15_65536a (hereinafter, occasionally represented by a reference numeral 15_i) respectively corresponding to the base counters 10_1-10_65536, and 19-bit memory fields 15_1b-15_1d, . . . , 15_65536b-15_65536d (hereinafter, occasionally represented by a reference numeral 15_i) corresponding to the standby counters 11_1-11_196608.

Figure 2A:
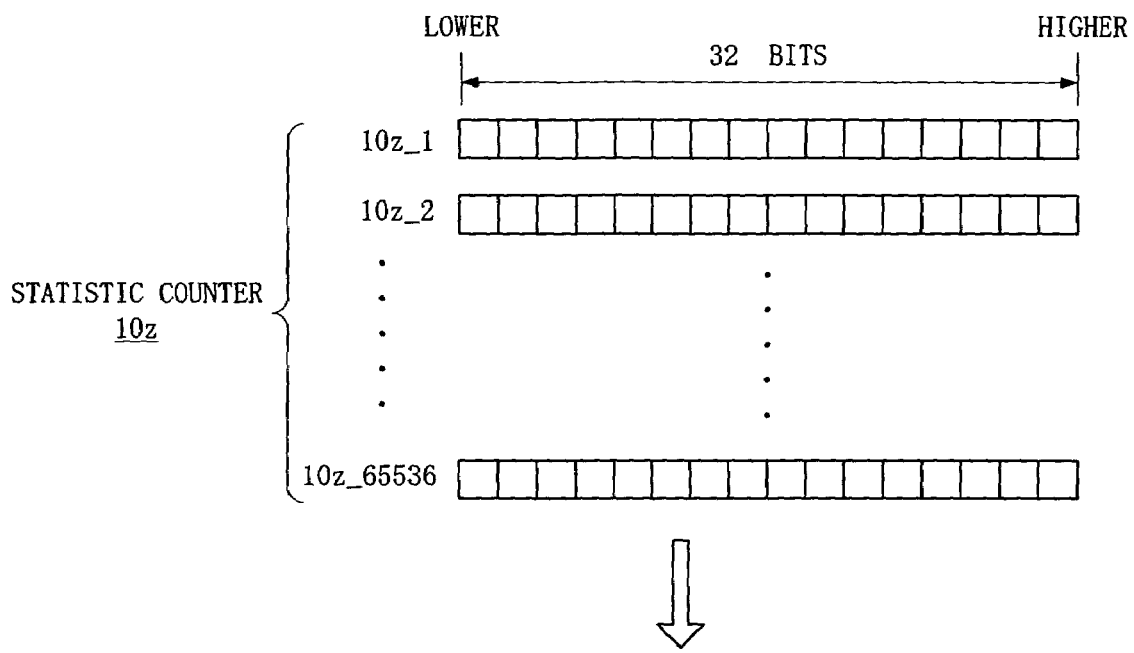
FIGS. 2A and 2B are block diagrams (2) showing a principle of a statistic counter device according to the present invention.
Figure 2B:
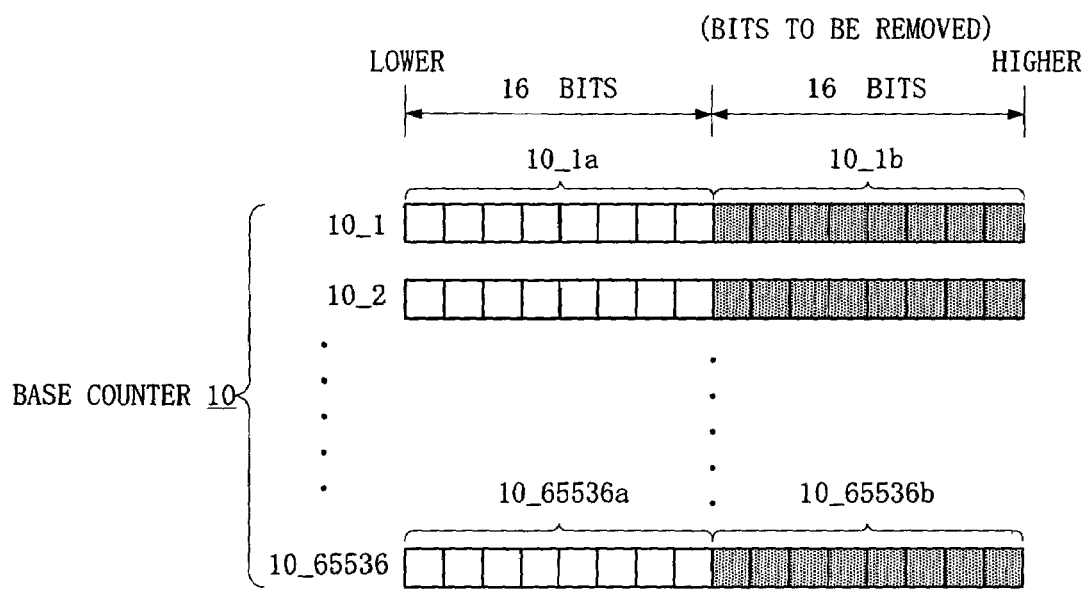
Figure 3A:
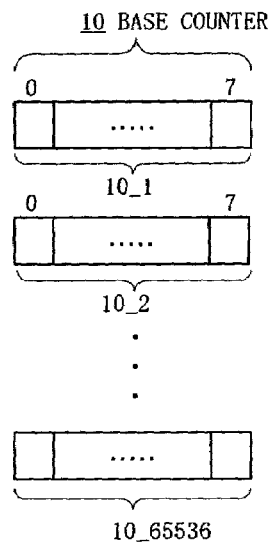
FIGS. 3A-3C are block diagrams showing an example of a bit number distribution to base counters and standby counters based on a principle of a statistic counter device according to the present invention.
Figure 3B:
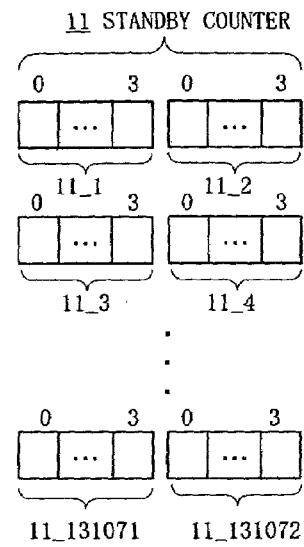
Figure 3C:
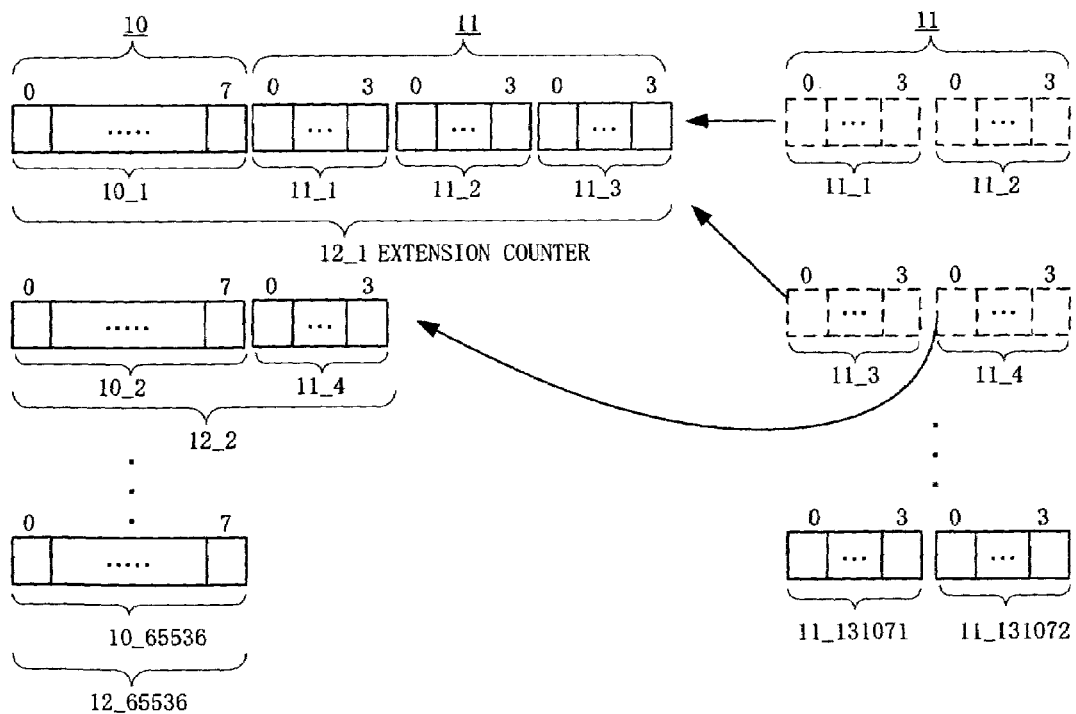

It is to be noted that since the bit numbers of the base counters 10 and the standby counters 11 are respectively made 8 bits and 4 bits in the embodiment (1), as described in FIG. 4, the bit number of the extension counters 12 can not be set per bit. Accordingly, for the average bit number of the base counters 10 and the standby counters 11, the bit number="20 (=8+4×3)" larger than the bit number=16 bits required for the worst case shown in FIGS. 2A and 2B is used.

The memory field 15_i is composed of a total "19" bits of an 18-bit pointer 15_i_p and a 1-bit flag 15_i_f. Bits 0-18, 19-37, 38-56, and 57-75 respectively corresponding to the memory fields 15_1a-15_1d are indicated on the memory fields 15_1a-15_1d of the counter management memory 15.

For example, a flag 15_1a_f of the memory field 15_1a indicates whether or not the standby counter 11_1 is linked to the highest (most significant) digit of the base counter 10_1. In this example, the flag 15_1a_f="0" means that "standby counter is linked", and a flag 15_1a_f="1" means that "standby counter is not linked".

For example, a pointer 15_1a_p indicates an address="0x1" of the memory field 15_1b corresponding to the standby counter 11_1 connected (linked) to the base counter 10_1.

In FIG. 6B, "0x1:0" which is a combination of the pointer and the flag is indicated.

Similarly, the flags 15_ib_f-15_id_f of the memory fields 15_ib-15_id indicate whether or not the standby counters 11 are further linked to the highest digits of the standby counters 11, and the pointers 15_ib_p-15_id_p indicate the addresses of the memory field 15_i corresponding to the standby counters 11 subsequently linked. When the standby counters 11 are not linked, a predetermined code indicating "unused" is set to the pointers 15_ib_p-15_id_p.

FIG. 6A shows an arrangement of the counter management cache memory 14 indicating which base counters 10 and standby counters 11 form the extension counters 12_1-12_65536 (=16_4; hereinafter, occasionally represented by a reference numeral 12) in the initial state.

Namely, the memory 14 is composed of 18-bit memory fields 14_1a-14_65536a (hereinafter, occasionally represented by a reference numeral 14_i) corresponding to the base counters 10 of the extension counters 12_1-12_65536, and 18-bit memory fields 14_1b-14_1g, . . . , 14_65536b-14_65536g (hereinafter, occasionally represented by a reference numeral 14_i similarly) corresponding to the standby counters 11. Accordingly, the maximum bit number of the extension counters 12="32" (="8+4×6").

Bits 0-17, 18-35, 36-53, 54-71, 72-89, 90-107 and 108-124 respectively corresponding to the memory fields 14_1a-14_1g are indicated on the memory fields 14_1a-14_1g of the counter management cache memory 14.

For example, addresses="0x0" and "0x1" of the counter management memory 15 in FIG. 6B are respectively set to the memory fields 14_1a and 14_1b of e.g. the extension counter 12_1, which indicates the base counter 10_1 and the standby counter 11_1 linked thereto to form the extension counter 12_1.

In the memory fields 14_1c-14_1g to which the standby counter 11 is not linked, a predetermined code indicating "unused" is set.

It is to be noted that only the base counters 10 without any standby counters 11 linked thereto are also referred to as the extension counters 12.

The counter management portion 13 manages the base counters 10, the standby counters 11 and the extension counters 12 based on the counter management cache memory 14.

FIG. 6C shows a link state shown in FIG. 6B, indicating a case where a single standby counter 11 is linked to each of the base counters 10_1-10_65536, for example indicating that the extension counter 12_1 is formed of the base counter 10_1 corresponding to the address 0x0 and the standby counter 11_1 corresponding to the address 0x1.

FIG. 6D shows an empty memory space set in the counter management memory 15. The standby counters 11 not linked to either the base counters 10_1-10_65536 or the extension counters 12_1-12_65536 (hereinafter, occasionally represented by extension counters) are linked to the empty memory space.

The addresses of the lowest end and the highest end of the link of the empty memory space are indicated by pointers (not shown). When the extension counters 12 require the standby counters 11, the standby counters 11 at the highest end are made "unused: 1" and separated from the empty memory space to be used. When the extension counters 12 no longer require the standby counters 11 and separate the standby counters 11, the separated standby counters 11 are preliminarily linked to the lowest end of the empty memory space.

Thus, it becomes easy to connect the standby counters 11 to the extension counters 12 and to separate the standby counters 11 from the extension counters 12.

It is to be noted that while the bit numbers of the base counters 10 and the standby counters 11 are respectively made 8 bits and 4 bits in the embodiment of FIGS. 6A-6D, the bit numbers can be preliminarily made values in conformity with the characteristic of the statistic counters (extension counters) required. Together with this, the numbers of standby counters 11 connected to the base counters 10 is determined.

FIGS. 7A and 7B show an operation procedure example (1) controlling the bit number of the extension counter 12. The operation procedure example (1) specifically indicates a procedure connecting the standby counter 11 to the extension counter 12. This procedure will now be described. It is to be noted that only a packet P1 corresponding to a single user will be noticeably described in this procedure. When the packets P1-P65536 corresponding to a plurality of users are processed, a processing step of selecting a packet may be inserted before this procedure.

Steps S10 and S11: In FIG. 7A, the counter management portion 13 waits for the input packet P1 and checks the value of the extension counter 12 when the packet P1 is received.

Step S12: When all of the bits of the extension counter 12=all "1 (full count)", the process proceeds to step S13. When all of the bits≠all "1", the process proceeds to step S14. It is to be noted that the determination at the step S12 may be performed when the extension counter assumes a count before the full count by a fixed range, instead of the case where the determination is performed when all of the bits=all "1".

Steps S13 and S14: After the standby counter 11 separated from the empty memory space is linked to the extension counter 12, the extension counter 12 is incremented by 1.

FIG. 7B shows a procedure where the counter management portion 13 connects the standby counter 11 to the extension counter 12 based on the counter management memory 15.

Step T11: When all of the bits of the extension counter 12=all "1", the counter management portion 13 retrieves a link state of the memory field 15_1a corresponding to the extension counter 12, and recognizes that the base counter 10_1 corresponding to the memory field 15_1a and the standby counter 11_1 corresponding to the memory field 15_1b are linked.

Steps T12 and T13: Therefore, the counter management portion 13 links the memory field 15_1c of an address="0x2" linked to the highest digit of the empty memory space (empty standby counter 11, see FIG. 7C) to the memory field 15_1b of the address="0x1" referring to the pointer (not shown) indicating the highest digit of the empty memory space. Namely, the counter management portion 13 sets the pointer 15_1b_p to "0x2", the flag 15_1b_f to "0", the pointer 15_1c_p to "unused", and the flag 15_1c_f to "1".

Step S14: The extension counter 12 is incremented by "1".

Thus, when the extension counter 12 is in the full count state, it becomes possible to link the standby counter 11 to the highest digit of the extension counter 12, thereby eliminating an overflow of the extension counter 12.

It is to be noted that the determination at step S12 may be performed before the full count by a fixed range, instead of the case where the determination is performed when the counter reaches the full count (all of the bits=all "1").

Figure 8A:
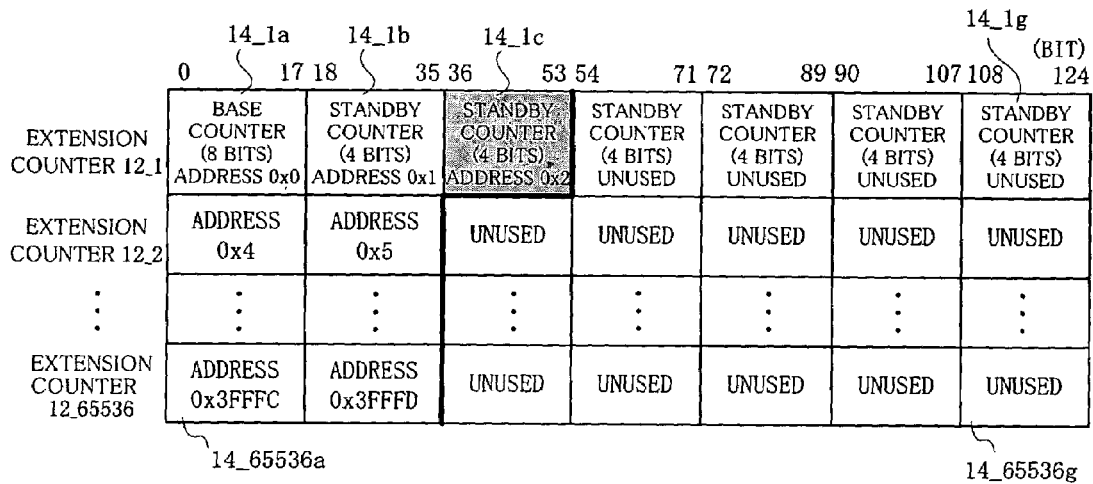
FIGS. 8A and 8B are diagrams showing a counter management cache memory and a counter management memory in an operation procedure example (1) of a statistic counter device according to the present invention.
Figure 8B:
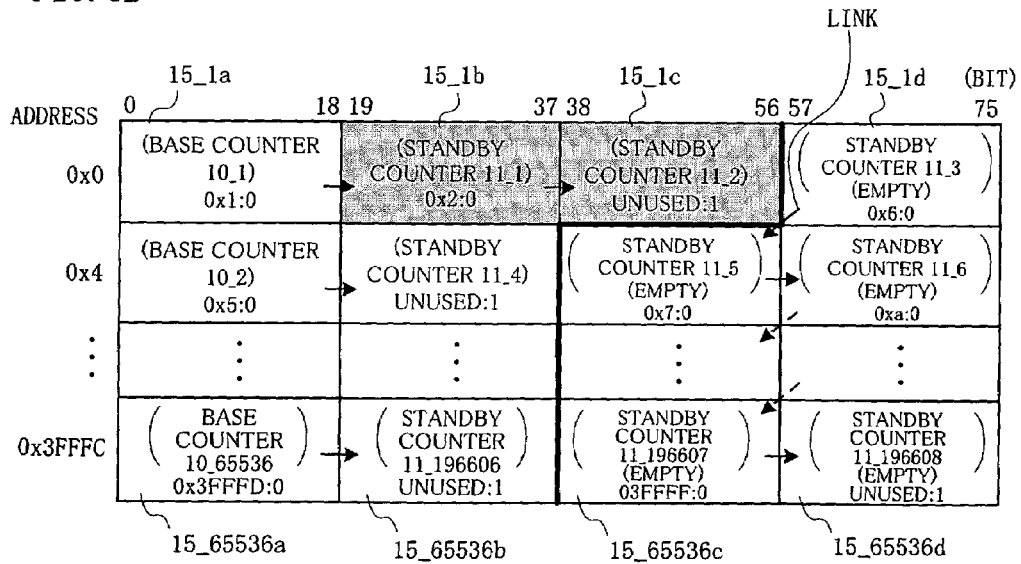

FIGS. 8A and 8B show the counter management cache memory 14 and the counter management memory 15 changed in the operation procedure example (1) shown in FIGS. 7A-7C.

FIG. 8A shows the counter management cache memory 14 in a case where the standby counter 11_2 corresponding to the address 0x2 is further linked to the extension counter 12_1. The address="0x2" of the memory field 15_1c of the counter management memory 15 corresponding to the standby counter 11_2 is set to the memory field 14_1c.

FIG. 8B shows the counter management memory 15 in a case where the standby counter 11_2 corresponding to the address 0x2 is further linked to the base counter 10_1 and the standby counter 11_1 linked with each other. The address="0x2" of the memory field 15_1c corresponding to the standby counter 11_2 and the flag="0" ("0x2": "0") are set to the memory field 15_1b, and "unused" and the flag="1" ("unused": "1") are set to the memory field 15_1c.

Thus, the counter management cache memory 14 is for caching the result managed by the counter management memory 15 for a duration up to the subsequent update of the counter management memory 15, and is required to secure count performance (high-speed operation) of the extension counter.

Figure 9A:
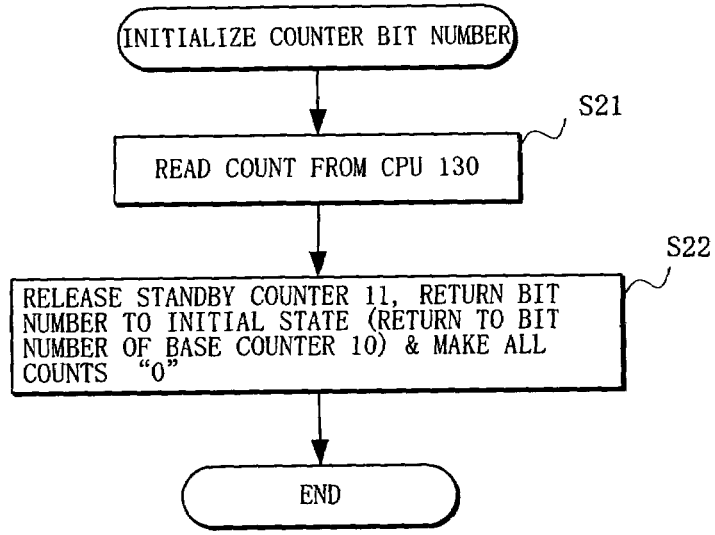
FIGS. 9A-9C are diagrams showing an operation procedure example (2) of a statistic counter device according to the present invention.
Figure 9B:
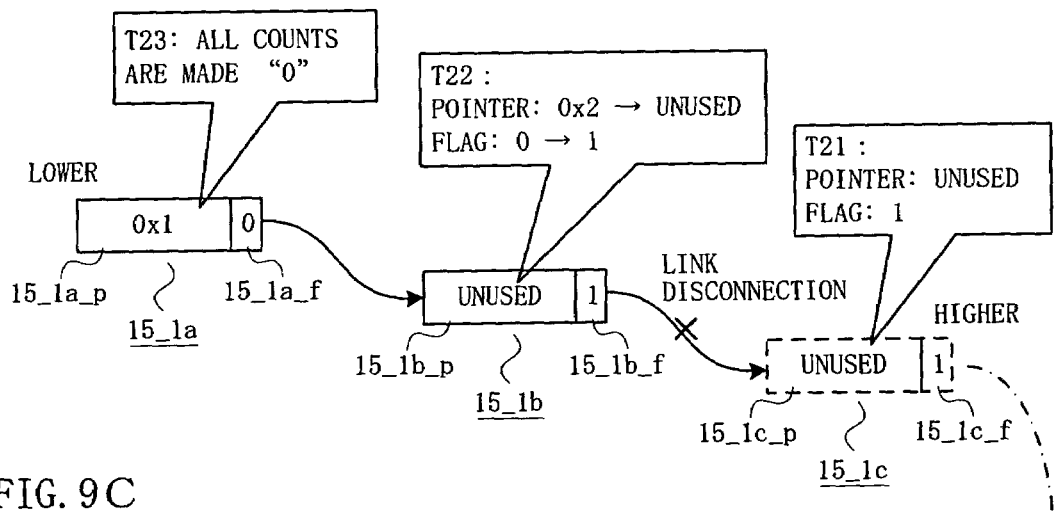
Figure 9C:
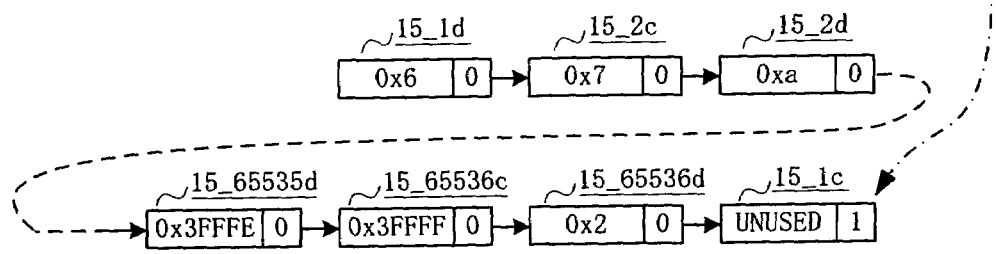

FIGS. 9A-9C show an operation procedure example (2) controlling the bit number of the extension counter 12. This operation procedure example (2) specifically shows a procedure of separating the standby counter 11 from the extension counter 12. This operation example (2) will now be described. It is to be noted that in the procedure example (2), only the packet P1 corresponding to a single user will be noticeably described in the same way as the operation procedure example (1) shown in FIGS. 7A-7C.

Figure 12:
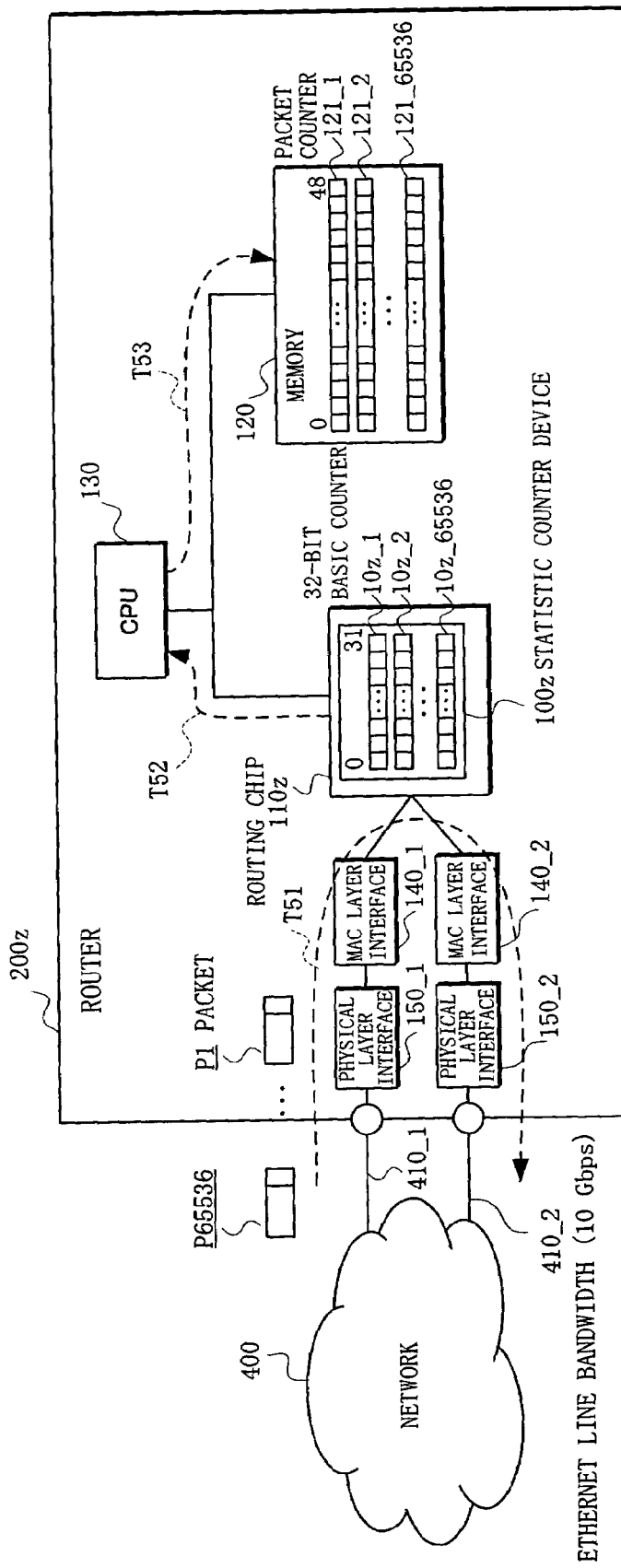
FIG. 12 is a block diagram showing a router example using a prior art statistic counter device.

Steps S21 and S22: In the presence of reading a count from e.g. the CPU 130 (see FIG. 12) in FIG. 9A, the counter management portion 13 separates all of the standby counters 11 from the extension counter 12, so that only the base counter 10 is left. The value of the base counter 10 (extension counter 12) is reset to "0".

FIG. 9B shows an operation procedure example in which the counter management portion 13 separates the standby counter 11_2 from the extension counter 12_1 based on the counter management memory 15.

Step T21: The counter management portion 13 retrieves a link (link starting at the memory field 15_1a) on the counter management memory 15 corresponding to the base counter 10_1 and recognizes the last end of the memory field 15_1c (flag 15_1c_f="1") of the link.

Step T22: The counter management portion 13 sets the pointer 15_1b_p of the memory field 15_1b linked to the field immediately before the memory field 15_1c to "unused" and the flag 15_1b_f to "1", separates the memory field 15_1c from the link, and returns the memory field 15_1c to the lowest digit of the empty memory space link (see FIG. 9C). Namely, the pointers 15_65536d_p and 15_65536d_f of the memory field 15_65536d are set to "0x2" and "0" respectively.

Step T23: The counter management portion 13 resets the values of the base counter 10_1 and the standby counter 11_1 corresponding to the memory fields 15_1a and 15_1b to "0".

It is to be noted that this example shows a case where the extension counter 12_1 composed of the base counter 10_1 and the standby counter 11_1 is made a base counter 10 of a minimum bit number.

Thus, it becomes possible to separate the standby counter 11 from the extension counter 12, leaving only the base counter 10 when the CPU 130 reads the value of the extension counter 12, thereby reducing the bit number of the counter.

Figure 10A:
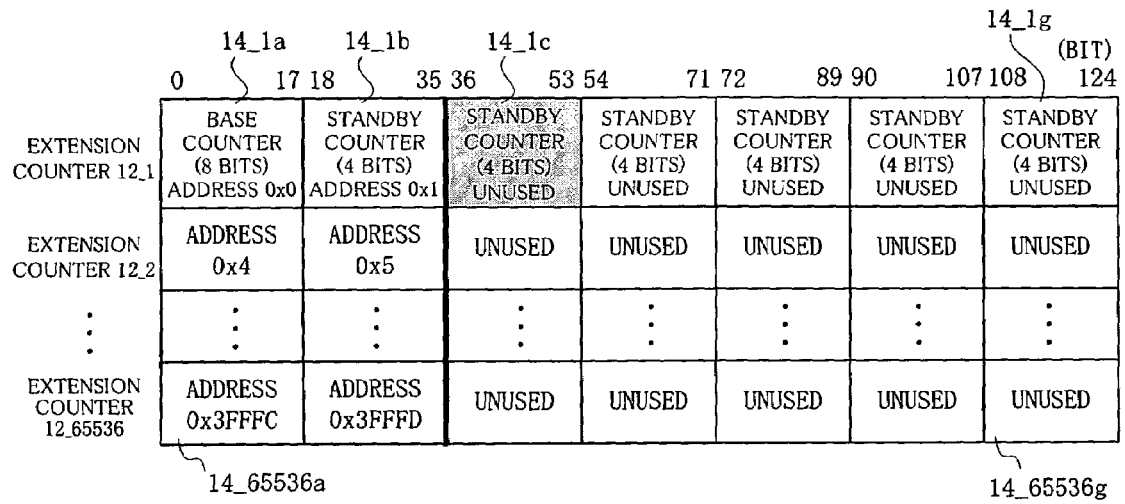
FIGS. 10A and 10B are diagrams showing a counter management cache memory and a counter management memory in an operation procedure example (2) of a statistic counter device according to the present invention.
Figure 10B:
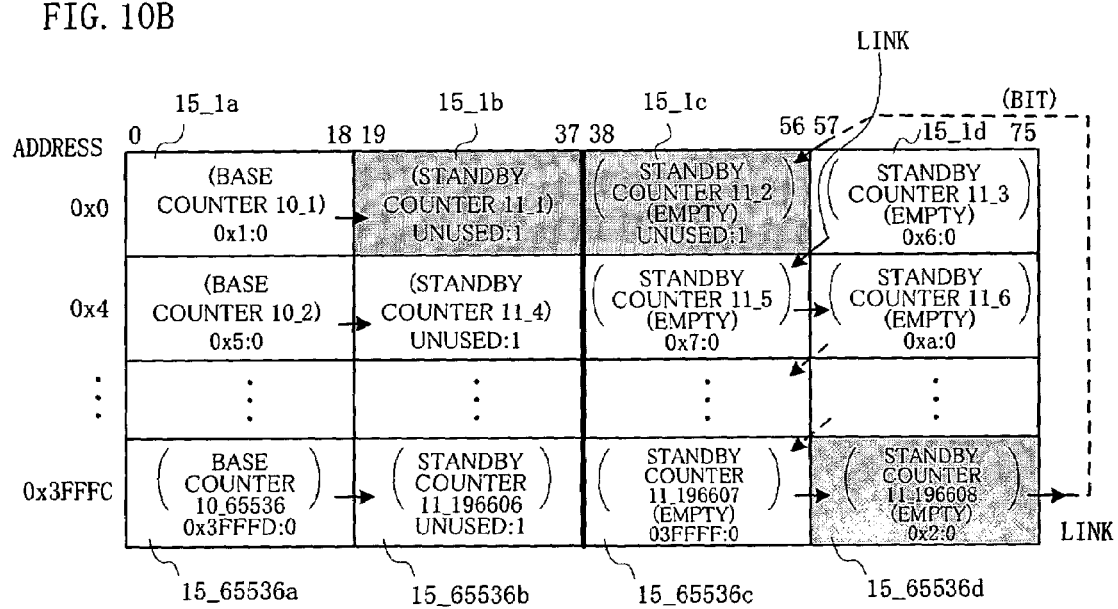

FIGS. 10A and 10B show the counter management cache memory 14 and the counter management memory 15 in a case where the standby counter 11_2 corresponding to the address 0x2 is separated from the extension counter 12_1 in the operation procedure example (2) shown in FIGS. 9A-9C.

FIG. 10A shows the counter management cache memory 14. The memory field 14_1c is changed from the memory field 14_1c="0x2" shown in FIG. 8A to "unused".

FIG. 10B shows the counter management memory 15. The pointer 15_1b_p and the flag 15_1b_f of the memory field 15_1b of the memory 15 are changed from "0x2" for the pointer 15_1c_p and "0" for the flag 15_1c_f shown in FIG. 8B to "unused" and "1", respectively.

Also, the pointer 15_65536d_p and the flag 15_65536d_f of the memory field 15_65536d are respectively changed from "unused" for the pointer 15_1c_p and "1" for the flag 15_1c_f shown in FIG. 8B to "0x2" and "0", so that the memory field 15_1c is linked.

Also, the pointer 15_1c_p and the flag 15_1c_f of the memory field 15_1c respectively remain "unused" and "1" to be linked to the empty space memory.

Figure 11A:
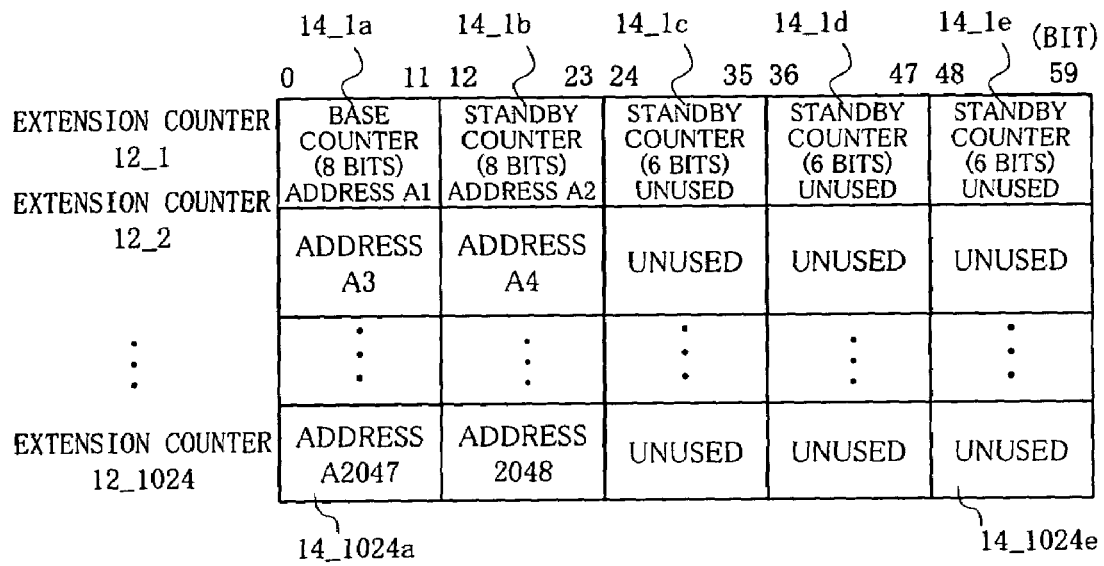
FIGS. 11A and 11B are diagrams showing examples of a counter management cache memory and a counter management memory in an embodiment (2) of a statistic counter device according to the present invention.
Figure 11B:
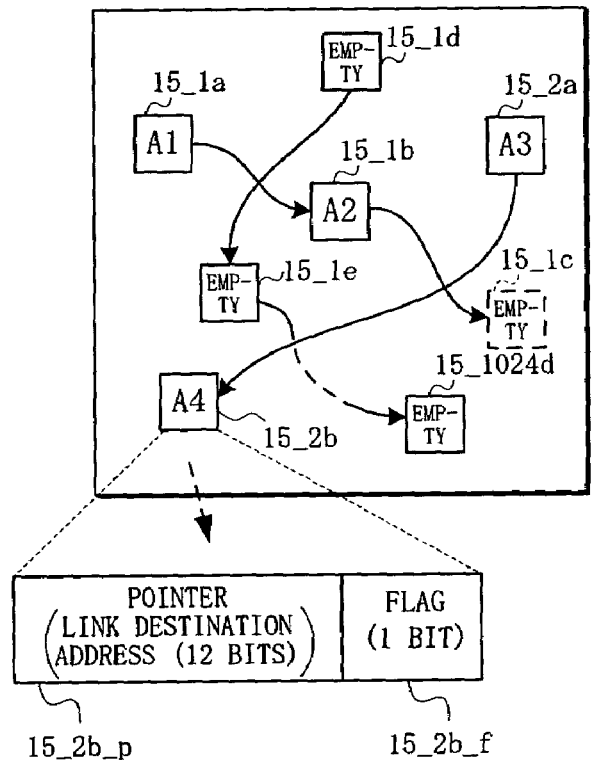

FIGS. 11A and 11B show an embodiment (2) of the statistic counter device 100 of the present invention. This embodiment (2) shows a case where the number of extension counters required is 1024. The statistic counter device 100 is provided with 1024 units of 8-bit base counters 10_1-10_1024 corresponding to the extension counters 12_1-12_1024 (hereinafter, occasionally represented by a reference numeral 12) and 1024 units of 8-bit standby counters 11 and 2048 units of 6-bit standby counters 11.

FIG. 11A shows an arrangement of the counter management cache memory 14. The 8-bit base counters 10 and 8-bit standby counters 11 form 16-bit extension counters 12. By linking one or more 6-bit standby counters 11 to the extension counter 12, extension counters 12 of 22 bits, 28 bits and 34 bits are formed. The bit number of the memory fields 14_1a-14_1e, ..., 14_1024a-14_1024e of the counter management cache memory 14 is "12", so that addresses corresponding to a total of 4096 ($=2^{12}$) units of the above-mentioned base counters 10 and the standby counters 11 are designated.

FIG. 11B shows an arrangement of the counter management memory 15. This example shows the link state of the extension counter 12 and the link state of the empty memory space (6-bit standby counter).

The bit number of the memory fields 15_1a-15_1d, ..., 15_1024a-15_1024d of the counter management memory 15 is "13". The bit number of the pointer 15_1a_p of the memory field 15_1a is "12" and the bit number of the flag 15_1a_f is "1".

Thus, the bit numbers of the base counters 10 and the standby counters 11 can be changed according to the characteristic of the information counted.

As described above, according to the statistic counter device of the present invention, a counter management portion forms extension counters by dynamically linking standby counters to higher digits of base counters when the base counters reach the full count or a count before the full count by a fixed range, and releases the link when the extension counters are reset. Therefore, it becomes possible to reduce a hardware scale and power consumption by dynamically controlling a bit number of the extension counters.

The bit number of all of the counters required in the statistic counter device 100 of the present invention is compared with that of the prior art statistic counter device 100z.

Figure 1A:
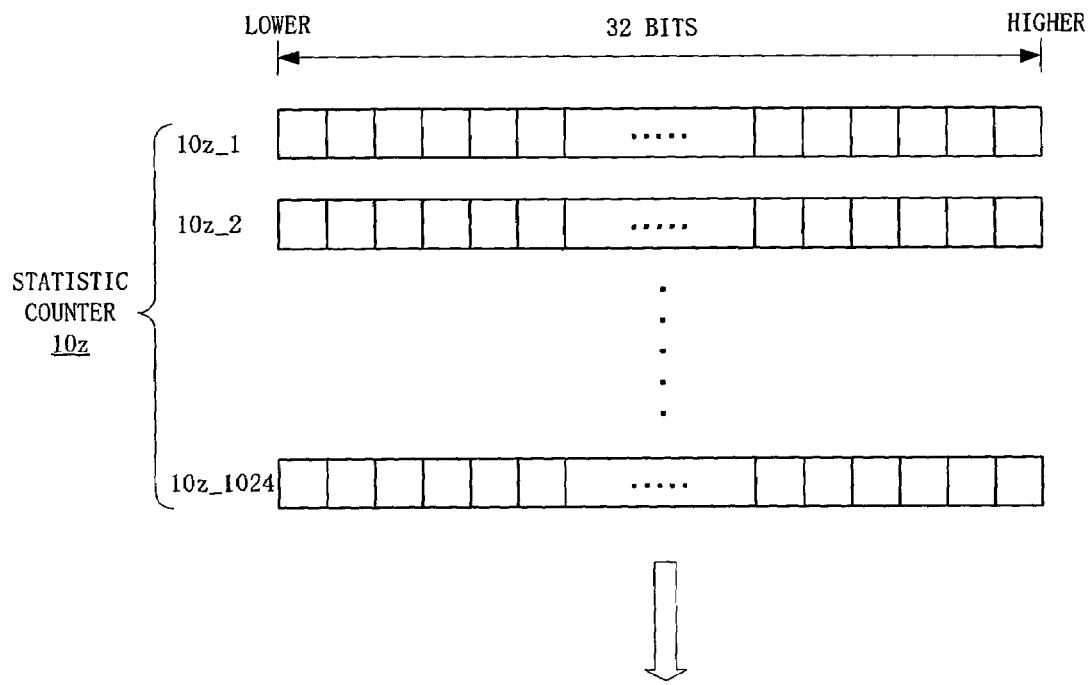
FIGS. 1A and 1B are block diagrams (1) showing a principle of a statistic counter device according to the present invention.
Figure 1B:
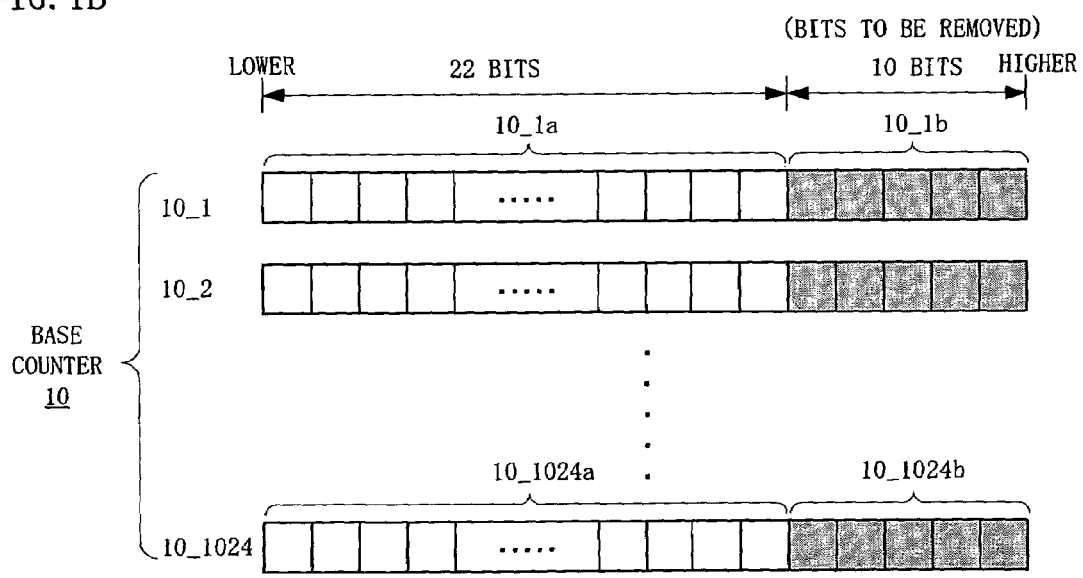

In FIGS. 1A and 1B, when the number of users is 1024, the bit number required by the statistic counter device 100 of the present invention is 22 bits×1024, while the bit number required by the prior art statistic counter device 100z is 32 bits×1024. Accordingly, it is effected that (22 bits×1024)/(32 bits×1024)≈0.69, thereby enabling approximately 30% of the hardware scale and the power consumption to be reduced.

When the number of users is 65536 in FIGS. 2A and 2B, the bit number required by the statistic counter device 100 of the present invention is 16 bits×65536, while the bit number required by the prior art statistic counter device 100z is 32 bits×65536. Accordingly, it is effected that (16 bits×65536)/(32 bits×65536)≈0.50, thereby enabling approximately 50% of the hardware scale and the power consumption to be reduced.

Furthermore, when the number of users is assumed to be 1000000=$2^{20}$, the bit number required by the statistic counter device 100 of the present invention is 12 bits×1000000, while the bit number required by the prior art statistic counter device 100z is 32 bits×1000000. Accordingly, it is effected that (16 bits×1000000)/(32 bits×1000000)≈0.38, thereby enabling approximately 60% of the hardware scale and the power consumption to be reduced.

What is claimed is:

1. A statistic counter device comprising:
a plurality of base counters;
a plurality of standby counters; and
a counter management portion which forms extension counters by dynamically linking the standby counters to higher digits of the base counters when the base counters reach a full count or a count before the full count by a fixed range, and releases the link when the extension counters are reset, wherein a total bit number of all of the base counters and all of the standby counters is equal to or more than a value obtained by multiplying a bit number of a counter counting a value obtained by dividing a total count counted by all of the base counters and the extension counters within a predetermined time by a number of the base counters, by the number of the base counters, and is less than a value obtained by multiplying a bit number which a single counter requires for counting the total count by the number of the base counters.

2. The statistic counter device as claimed in claim 1, wherein when the extension counters reach the full count or the count before the full count by the fixed range, the counter management portion forms re-extension counters in which the standby counters are linked to higher digits of the extension counters.

3. The statistic counter device as claimed in claim 1, wherein a total bit number of all of the base counters and all of the standby counters, and numbers of the base counters and the standby counters are values corresponding to a distribution state of a bandwidth of a user packet.

4. The statistic counter device as claimed in claim 1, wherein the counter management portion includes a counter management memory indicating a link state of the base counters and the standby counters.

5. The statistic counter device as claimed in claim 4, wherein the counter management portion includes a counter management cache memory indicating extension counters composed of the base counters and the standby counters which are in the link state indicated by the counter management memory.

6. The statistic counter device as claimed in claim 1, wherein the counter management portion resets the base counters and the extension counters at a predetermined period.

7. The statistic counter device as claimed in claim 6, wherein the counter management portion adds a value of the base counters and the extension counters to a corresponding external counter before the reset.

8. The statistic counter device as claimed in claim 1, wherein a total bit number of all of the base counters and all of the standby counters, and numbers of the base counters and the standby counters are values corresponding to a stochastic distribution state of a user packet.

9. The statistic counter device as claimed in claim 8, wherein when the standby counters used for a linkage run short, the counter management portion resets the base counters or the extension counters to which the standby counters can not be linked.

10. The statistic counter device as claimed in claim 9, wherein the counter management portion adds values of the base counters or the extension counters to a corresponding external counter before the reset.

* * * * *